United States Patent Office 3,476,777
Patented Nov. 4, 1969

3,476,777
NOVEL 6-CHROMANOL DERIVATIVES AND
THEIR PREPARATION
Masuo Murakami, Kozo Takahashi, Jun Matsumoto, and Kiyoshi Murase, Tokyo, and Kazuharu Tamazawa and Shigeo Kawamura, Urawa, Saitama, and Junichi Terao, Tokyo, Japan, assignors to Yamanouchi Pharmaceutical Co., Ltd., Tokyo, Japan, a corporation of Japan
No Drawing. Filed Sept. 27, 1966, Ser. No. 582,266
Claims priority, application Japan, Oct. 27, 1965, 40/65,439; Nov. 17, 1965, 40/71,016; Nov. 29, 1965, 40/72,830; May 24, 1966, 41/32,680; May 26, 1966, 41/33,176
Int. Cl. C07d 7/32
U.S. Cl. 260—345.5          16 Claims

ABSTRACT OF THE DISCLOSURE

The present invention relates to 5-substituted 6-chromanol derivatives such as for example:

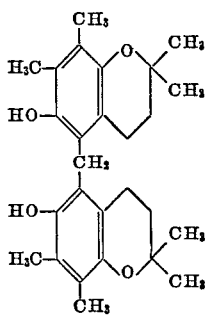

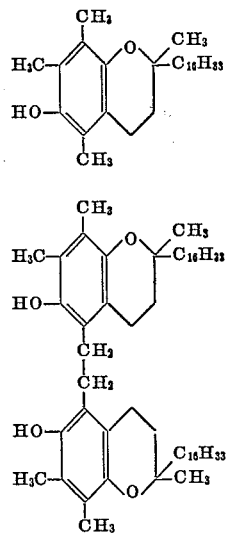

These compounds have high antioxidant activity.

---

This invention relates to novel 6-chromanol derivatives having significant antioxidant activity and to their preparation.

It has been already known in U.S. Patent No. 3,173,927 that α-tocopherol (Formula I), which is a derivative of 6-chromanol, and its dimer (Formula II) have antioxidant activity.

According to the description of said U.S. patent specification, the dimeric derivative of α-tocopherol of Formula II has greater antioxidant activity, especially for fats and oils, than α-tocopherol itself.

It was now found that 5-substituted - 6 - chromanol derivatives indicated by the general Formula III:

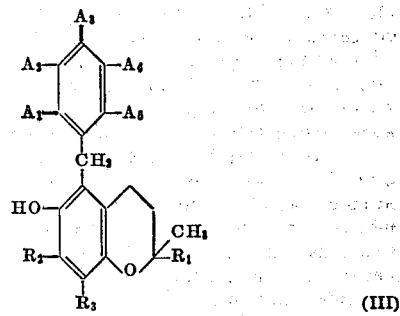

(III)

(wherein $R_1$ represents a member selected from the group consisting of alkyl radical, aryl radical and 4′,8′,12′ - trimethyl tridecyl radical, and $R_2$ and $R_3$ represent, same or different, a member selected from the group consisting of hydrogen atom, lower alkyl and alkoxy radical, and $R_2$ and $R_3$ together may represent a

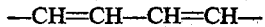

radical. $A_1$–$A_5$ represent, same or different, a member selected from the group consisting of hydrogen atom, halogen atom, hydroxyl radical, alkyl radical, aryl radical and alkoxy radical, here at least, either $A_1$ or $A_3$ must be a hydroxyl radical and when $A_1$ is a hydroxyl radical $A_4$ and $A_5$ together represent a

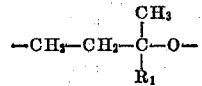

radical, wherein $R_1$ has the previously defined meaning, have more sufficient antioxidant activity than the dimer derivative of α-tocopherol of said Formula II. Furthermore it was found that the extent of antioxidant activity is greater than other well-known and readily available antioxidants.

Novel compounds of the present invention indicated by Formula III can be prepared by reacting 5 - halogenomethyl-6-chromanol derivaties of the following general Formula IV:

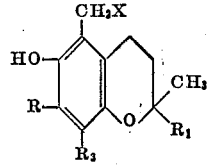

(IV)

wherein $R_1$–$R_3$ have the previous definitions, and X represents a halogen atom, with phenol derivatives of Formula V:

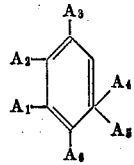

(V)

wherein $A_1$–$A_5$ have the previous definitions, and $A_6$ represents a hydrogen atom or a halogenomethyl radical. So far as either $A_1$ or $A_6$ represent respectively a hydroxyl radical or a halogenomethyl, $A_4$ and $A_5$ together represent a

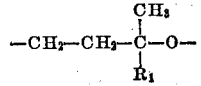

radical, wherein $R_1$ has the previously defined meaning. On that occasion it is considered that two different forms of reaction may be developed due to the combination of raw materials. One is a condensation reaction ($a$-reaction) under the separation of a hydrogen halogenide from a halogen atom of the compound of Formula IV and a hydrogen atom of $A_6$ of the compound of Formula V. The other is a condensation reaction ($b$-reaction) under the separation of dihalogenide methane from a halogen atom of the compound of Formula IV and a halogenide methyl radical of $A_6$ of the compound of Formula V. However, these reaction mechanisms are not clarified yet. These condensation reactions can be conducted by admixing equal molecular of raw materials in the presence of the solvent, such as ether, petroleum ether, benzene, carbontetrachloride or n-hexane, and by standing at normal temperature. These reactions can be accelerated by a reaction promoting agent, such as a little water, Lewis acid, such as zinc chloride, aluminum chloride, or inorganic or organic acid, such as phosphoric acid, acetic acid, monochloroacetic acid, trichloroacetic acid, and silica gel. Such reaction promoting agents have somewhat singularity to the raw materials used. Lewis acid is especially useful for said $a$-reaction, and the other acids are especially useful for said $b$-reaction. The isolation of the object product from the reaction solution can be performed by the well known methods. Most of thus obtained compounds of Formula III of the present invention are white crystals, which are insoluble in water but easily soluble in chloroform and also soluble in alcohol, acetone, benzene, ethyl acetic acid and carbon tetrachloride, and which are also tasteless odorless and stable at the high temperature. Accordingly, the compounds of this invention have superior and significant utility as the readily available antioxidant for animal feed compositions, provisions and medicaments, etc. Namely, the compounds of Formula III can be employed in such commercial products directly in crystal form or after added to a diluent. The quantity to be added is most preferable, when its portion is between about 0.01 w./w. percent and 1 w./w. percent. And it can be varied within the limits properly according to the substance added.

Moreover, raw material compounds of Formula IV are halogenized in a methyl radical of 5 position of chroman derivatives selectively by reacting 2,5 - dimethyl-6-chromanol derivative of the general formula:

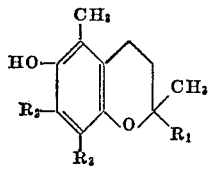

wherein $R_1$–$R_3$ are the same as the above indicated, with a halogenating agent, such as thionylhalogenide, sulfurylhalogenide, phosphorpentachloride, chlorine and bromine.

This invention is further illustrated by the following examples. However, this invention is not limited to the specific embodiments of the invention appearing in these examples unless otherwise indicated.

EXAMPLE I

The solution of 1 g. of 2,2,7,8-tetramethyl-5-chloromethyl-6-chromanol in 10 ml. of benzene was allowed to stand at room temperature to evaporate the benzene. The residue obtained was washed with petroleum ether and dried, whereupon the object product, 0.4 g. of white crystals of 5,5'-methylenebis(2,2,7,8-tetramethyl-6-chromanol) was obtained. The recrystallization from aceton yielded the product having a melting point of 230–232° C. under decomposition.

Analysis.—Calculated for $C_{27}H_{36}O_4$: C, 76.38; H, 8.55. Found: C, 76.15; H, 8.32.

The N.M.R. spectrum showed the presence of methylene group (—$CH_2$—) in diphenylmethane having the theoretical strength at 6.1τ.

EXAMPLE II

To the solution of 500 mg. of 2,2,7,8-tetramethyl-5-chloromethyl-6-chromanol in 10 ml. of petroleum ether were added 2 g. silica gel. After allowed to stand for five minutes, the silica gel was separated from petroleum ether solution and eluted with chloroform. The obtained chloroform solution was concentrated and the resulting precipitate was filtered and washed with petroleum ether, whereupon 260 mg. of the white crystals of 5,5'-methylenebis(2,2,7,8-tetramethyl-6-chromanol) were obtained. The recrystallization from aceton yielded the product having a melting point of 230–232° C. under decomposition. The product showed the same values of I.R. and N.M.R. spectrums as the theoretical values and did not show the depression in its melting point, when mixed with an authentic sample prepared in Example I.

EXAMPLE III

To the solution of 468 mg. of 2,5,7,8-tetramethyl-2-ethyl-6-chromanol in 5 ml. of benzene were added the solution of 270 mg. of sulfuryl chloride in 1 ml. of benzene. The mixture was treated with the same procedure as in Example II, whereupon 220 mg. of white crystals of 5,5'-methylenebis(2,7,8-trimethyl-2-ethyl-6-chromanol) were obtained. The recrystallization from acetone yielded the product having a melting point of 185–187° C. under decomposition.

Analysis.—Calculated for $C_{29}H_{40}O_4$: C, 76.95; H, 8.91. Found: C, 76.67; H, 8.73.

In the case that 500 mg. of 2,5,7,8-tetramethyl-2-propyl were used as starting material in the same procedure as in Example II, 210 mg. of white crystals of 5,5'-methylenebis(2,7,8 - trimethyl-2-propyl-6-chromanol) were obtained. The recrystallization from acetone yielded the product having a melting point of 173–175° C. under decomposition.

Analysis.—Calculated for $C_{31}H_{44}O_4$: C, 77.46; H, 9.23. Found: C, 77.53; H, 9.11.

In the case that 2 g. of 2,2,7,8-tetramethyl-5-bromomethyl-6-chromanol were used as starting material in the same procedure as in Example II, 11 g. of white crystals of 5,5' - methylenebis(2,2,7,8-tetramethyl-6-chromanol) were obtained. The product did not show the depression in its melting point, when mixed with an authentic sample sample prepared in Example I.

EXAMPLE IV

To the solution of 1 g. of 2,2,7,8-tetramethyl-5-chloromethyl-6-chromanol in 2 ml. of ether was added 0.5 g. of monochloroacetic acid. After stirred for 20 minutes, the crystals thus obtained were filtered and washed with water and petroleum ether, whereupon 0.6 g. of white crystals of 5,5' - methylenebis(2,2,7,8 - tetramethyl-6-chromanol) was obtained. The product did not show the depression in its melting point, when mixed with an authentic sample prepared in Example I.

EXAMPLE V

To the solution of 1 g. of 2,2,7,8-tetramethyl-5-chloromethyl-6-chromanol in 2 ml. of ether was added 0.5 g. of 80% phosphoric acid. After vigorous stirring, the crystals obtained were treated as in Example IV, whereupon 0.5 g. of white crystals of 5,5'-methylenebis(2,2,7,8-tetramethyl-6-chromanol) was obtained. The product did not show the depression in its melting point, when mixed with an authentic sample prepared in Example I.

EXAMPLE VI

To the solution of 1 g. of p-cresol in 30 ml. of petroleum ether was added slowly with stirring at room temperature the solution of 1 g. of 2,2,7,8-tetramethyl-5-chloromethyl-6-chromanol in 30 ml. of petroleum ether. After stirred for 2 hours, the formed crystals were removed and dried, whereupon 1.1 g. of 2,2,7,8-tetramethyl-5-(2'-hydroxy-5'-methylbenzyl)-6-chromanol were obtained. The recrystallization from benzene yielded the product having a melting point of 170–172° C. The N.M.R. spectrum showed the presence of methylene group in the diphenylmethane having the theoretical strength at 6.15τ.

*Analysis.*—Calculated for $C_{21}H_{26}O_3$: C, 77.27; H, 8.03. Found: C, 77.53; H, 8.06.

In the case that p-chlorophenol instead of p-cresol was used as starting material in the same procedure as in Example VI, 2,2,7,8-tetramethyl-5-(2'-hydroxy-5'-chlorobenzyl)-6-chromanol was obtained. The recrystallization from benzene yielded the product having a melting point of 173–175° C.

*Analysis.*—Calculated for $C_{20}H_{23}O_3Cl$: C, 69.26; H, 6.68. Found: C, 69.38; H, 6.61.

In the case that 2,4,5-trimethylphenol instead of p-cresol was used as starting material in the same procedure as in Example VI, 2,2,7,8-tetramethyl-5-(2'-hydroxy-3',5',6'-trimethylbenzyl)-6-chromanol was obtained. The recrystallization from n-hexane or benzene yielded the product having a melting point of 154–155° C.

*Analysis.*—Calculated for $C_{23}H_{30}O_3$: C, 77.93; H, 8.53. Found: C, 78.12; H, 8.47.

In the case that 2,6-dimethylphenol instead of p-cresol was used as starting material in the same procedure as in Example VI, 2,2,7,8 - tetramethyl - 5 - (3',5' - dimethyl-4'-hydroxybenzyl-6-chromanol was obtained. The recrystallization from benzene or n-hexane yielded the product having a melting point of 150° C.

*Analysis.*—Calculated for $C_{22}H_{28}O_3$: C, 77.61; H. 8.29. Found: C, 77.83; H, 8.31.

EXAMPLE VII

To the solution of 0.6 g. of 2,4-dimethylphenol in 10 ml. of ether was added 1 g. of zinc chloride, to which was added slowly with stirring at room temperature the solution of 0.6 g. of 2,2,7,8 - tetramethyl - 5 - chloromethyl - 6 - chromanol in 10 ml. of ether. The resulting solution was stirred for another one hour. To the reaction mixture were added 50 ml. of ether to dissolve the formed oily product. After the solution was washed with N-NaOH solution containing a little amount of hydrosulfide and next with water, the ether solution was dried with sodium sulfic anhydrid. To the oily product obtained by concentration was added petroleum ether and allowed to stand, whereupon 0.55 g. of white crystals of 2,2,7,8-tetramethyl-5-(2'-hydroxy-3',5'-dimethylbenzyl)-6-chromanol was obtained. The recrystallization from n-hexane yielded the product having a melting point of 117–118° C.

*Analysis.*—Calculated for $C_{22}H_{28}O_3$: C, 77.61; H, 8.29. Found: C, 77.73; H, 8.13.

In the case that 2,3,5-trimethyl hydroquinone instead of 2,4-dimethylphenol was used as starting material in the same procedure as in Example VII, 2,2,7,8-tetramethyl-5-(2'-5'-hydroxy 3',4',6'-trimethylbenzyl)-6-chromanol was obtained. The recrystallization from dimethylformamide yielded the product having a melting point of 233–235° C.

*Analysis.*—Calculated for $C_{23}H_{30}O_4$: C, 74.56; H, 8.16. Found: C, 74.55; H, 8.08.

EXAMPLE VIII

To the solution of 0.5 g. of β-naphthol in the mixture of 5 cc. of ether and 30 cc. of petroleum ether was added with vigorous stirring 1 g. of 2,2,7,8-tetramethyl-5-chloromethyl-6-chromanol. The reaction occurred immediately under evolution of chlorine gas and pale pink crystals were formed. After allowed to stand for 20 minutes, the formed crystals were filtered and washed with a little amount of benzene, whereupon 1.1 g. of white needles of 2,2,7,8-tetramethyl - 5 - (2' - hydroxy - 1' - naphthylmethyl) - 6 - chromanol having a melting point of 183–184° C. were obtained. The recrystallization from benzen-petroleum-ether yielded the product having a melting point of 185–186° C. The I.R. spectrum showed the absorptions at 820 cm.$^{-1}$ and 743 cm.$^{-1}$ accordance with the C—H out-of-plane bending vibration of 1,2-substituted naphthaline having a special aromatic ring.

EXAMPLE IX

To the solution of 1.0 g. of 2,2,7,8-tetramethyl-6-chromanol in 5 cc. of petroleum ether was added the solution of 1.5 g. of 2,2,7,8-tetramethyl-5-bromomethyl-6-chromanol in 20 ml. of petroleum ether. Immediately the reaction occurred under evolution of hydrogen bromide gas and white crystals were formed. After allowed to stand for 20 minutes, the precipitated crystals were filtered and washed with petroleum ether, whereupon 1.9 g. of white crystals of 5,5' - methylenebis - (2,2,7,8-tetramethyl)-6-chromanol were obtained. The recrystallization from acetone yielded the product having a melting point of 230–232° C. This product did not show the depression in its melting point, when mixed with an authentic sample prepared by other process.

EXAMPLE X

To the solution of 0.7 g. of 4 - hydroxy-4'-methylbiphenyl in 10 ml. of ether were added with stirring for one hour at room temperature 0.5 g. of 2,2,7,8-tetramethyl-5-chloromethyl-6-chromanol and 1 g. of zinc chloride. The reaction mixture was washed with NaOH solution and water and dried with magnesium sulfuric anhydride. The resulting oily residue obtained after removing ether was purified with column chromatography of silica gel benzene system, whereupon 220 mg. of 2,2,7,8-tetramethyl-5-(2' - hydroxy - 5' - p-toluyl-benzyl)-6-chromanol were obtained. The recrystallization from benzene or n-hexane yielded the product having a melting point of 169–170° C.

*Analysis.*—Calculated for $C_{27}H_{30}O_3$: C, 80.56; H. 7.51. Found: C, 80.38; H, 7.62.

EXAMPLE XI

To the solution of 280 mg. of 2,5,7,8-tetramethyl-2-phenyl-6-chromanol in 10 ml. of benzene were added 135 mg. of sulfuryl chloride. After allowed to stand overnight, the formed red-brown precipitate was discarded. By removing the solvent from the resulting solution, oily products were obtained. To the solution of 0.5 g. of p-cresol in 10 ml. of petroleum ether was added the solution of 5 ml. of the oily products in petroleum ether. The solution was stirred for one hour at room temperature. The resulting ether solution was washed with sodium hydroxide solution and water and dried with magnesium sulfate anhydride, whereupon ether was evaporated. The obtained oily products were treated with column chromatography of silica gel-benzene system, whereupon 90 mg. of pure 2,7,8-trimethyl - 2 - phenyl - 5 - (2' - hydroxy - 5 - methylbenzyl)-6-chromanol were obtained. The recrystallization from acetone yielded the product having a melting point of 132–133° C.

*Analysis.*—Calculated for $C_{26}H_{28}O_3$: C, 80.38; H, 7.27. Found: C, 80.15; H, 7.23.

EXAMPLE XII

To the solution of 2,6-dimethylphenol in petroleum ether was added the solution of 2,7,8-trimethyl-2-ethyl-5-chloromethyl-6-chromanol in petroleum ether. After one hour's stirring at room temperature, the crystals thus obtained were filtered off and dried, whereupon 400 mg. of 2,7,8-trimethyl-2-ethyl - 5 - (3',5'-dimethyl-4'-hydroxybenzyl)-6-chromanol were obtained. The recrystallization from benzene yielded the product having a melting point of 137° C.

*Analysis.*—Calculated for $C_{23}H_{30}O_3$: C, 77.93; H, 8.53. Found: C, 77.89; H, 8.71.

EXAMPLE XIII

Into the column of silica gel was poured the solution of 200 mg. of 5-chloromethyl-7,8-dimethoxy-2,2-dimethyl-6-chromanol in a small amount of chloroform, and the absorbed was eluted with n-hexane and ether. By concentrating the n-hexane and ether solution were obtained 70 mg. of white scaly crystals of 5,5'-methylenebis-(7,8-dimethoxy-2,2-dimethyl-6-chromanol) having a melting point of 185–190° C. under decomposition. The recrystallization from n-hexane yielded the product having a melting point of 190–193° C. under decomposition.

*Analysis.*—Calculated for $C_{27}H_{36}O_8$: C, 66.37; H, 7.43. Found: C, 66.67; H, 7.65.

The N.M.R. spectrum showed the presence of methylene group (—$CH_2$—) of diphenylmethane having the theoretical strength at 6.08τ.

EXAMPLE XIV

To the solution of 200 mg. of 5-chloromethyl-7,8-dimethoxy-2,2-dimethyl-6-chromanol and 177.3 mg. of 2,4,5-trimethylphenol in 10 ml. of dry ether was added zinc chloride as catalyst and stirred for two hours at room temperature. To the reaction mixture were added with stirring 30 ml. of ether and 20 ml. of water, from which the ether layer was separated, washed with 1 N-NaOH solution and water and dried with sodium sulfate anhydride. By distillation of ether was obtained a thickly syrup. The recrystallization from n-hexane yielded white crystals of 7,8-dimethoxy-2,2-dimethyl - 5 - (2'-hydroxy-3',5',6'-trimethyl)-6-chromanol having a melting point of 145–153° C. under decomposition.

*Analysis.*—Calculated for $C_{23}H_{30}O_5$: C, 71.84; H, 7.28. Found: C, 71.50; H, 7.34.

The N.M.R. spectrum showed the presence of methylene group in the diphenylmethane having theoretical strength at 6.08τ.

EXAMPLE XV

This example illustrates the antioxidant activity of products of this invention and the comparison of this antioxidant activity with the antioxidant activity of BHT (2,6-di-tert-butyl-p-cresol), α-tocopherol dimer and vitamin E. Samples of margarine (contained vitamin A of 1080 IU, international units) containing the product of this invention, e.g., 5,5'-methylenebis-(2,2,7,8-tetramethyl-6-chromanol), and containing 2,2,7,8-tetramethyl-5-(2'-hydroxy-5'-methylbenzyl)-6-chromanol at the concentration of 0.1 weight percent were prepared and compared in an accelerated antioxidant activity test with samples of the same margarine containing BHT, α-tocopherol dimer or vitamin E respectively at the same concentration and also with a sample of the same margarine containing no antioxidant. After those samples were allowed to stand for 90 days at room temperature, the amount of vitamin A of each sample was measured and compared by means of Care Price's colorimetry method. Optical density was measured after one minute, added color coupler. The results are shown in Table I.

TABLE I

| Sample | The amount of Vitamin A after 90 days | |
|---|---|---|
| | Vitamin A (IU) | Residual amount of Vitamin A (percent) |
| Margarine plus 5,5'-methylenebis-(2,2,7,8-tetramethyl-6-chromanol) | 903.0 | 83.35 |
| Margarine plus 2,2,7,8-tetramethyl-5-(2'-hydroxy-5'-methylbenzyl)-6-chromanol | 842.0 | 77.9 |
| Margarine plus BHT | 784.0 | 72.6 |
| Margarine plus α-tocopherol dimer | 467.0 | 43.2 |
| Margarine plus vitamin E | 453.0 | 41.9 |
| Margarine containing no antioxidant | 76.9 | 7.1 |

EXAMPLE XVI

Samples of 10 g. of lard containing 10 ml. of the 0.05, 0.005, 0.0005% solution of 5,5'-methylenebis-(2,2,7,8-tetramethyl-6-chromanol) in ethanol were respectively prepared and compared in peroxide value (peroxide milliequivalent per kilogram of the sample) with samples of the same lard containing BHT, α-tocopherol dimer or vitamin E respectively at the same concentration. After those samples were allowed to stand for 7 days at 56° C., the peroxide value was measured by the Lea method (Organic Analysis 4, 12 (1960)). The results are shown in Table II. It will be noted that the peroxide value of sample of the same lard containing no antioxidant was 270 milliequivalent per kilogram of the sample.

TABLE II

| Sample | Concentration (percent) | | |
|---|---|---|---|
| | 0.05 | 0.005 | 0.0005 |
| Lard 5,5'-methylenebis-(2,2,7,8-tetramethyl-6-chromanol) | 3.85 | 4.52 | 7.82 |
| Lard BHT | 4.90 | 6.70 | 65.0 |
| Lard α-tocopherol dimer | 10.0 | 5.40 | 8.50 |
| Lard vitamin E | 8.78 | 6.00 | 11.5 |

What we claim is:

1. The 5-substituted-6-chromanol compound represented by the formula:

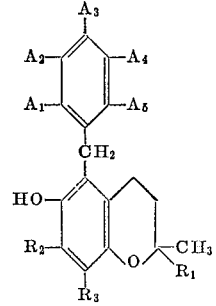

wherein $R_1$ represents a member selected from the group consisting of lower alkyl radical, phenyl radical and 4',8',12'-trimethyltridecyl radical, and $R_2$ and $R_3$ represent, same or different, a member selected from the group consisting of hydrogen atom, methyl radical and methoxy radical, and $R_2$ and $R_3$ together may represent a —CH=CH—CH=CH— radical, wherein $A_1$–$A_5$, same or different, represent a member selected from the group consisting of hydrogen atom, halogen atom, hydroxyl radical, lower alkyl radical, and phenyl radical wherein $A_1$ or $A_3$ must be a hydroxyl radical, and when $A_1$ is a hydroxyl radical, $A_4$ and $A_5$ together may represent a

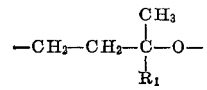

radical with the oxygen atom being connected at $A_4$, wherein $R_1$ has the previously defined meaning.

2. A compound as defined in claim 1 wherein the 6-chromanol derivative is 5,5'-methylenebis-(2,2,7,8-tetramethyl-6-chromanol).

3. 5,5'-methylenebis(2,7,8-trimethyl-2-ethyl - 6 - chromanol).

4. A compound as defined in claim 1 wherein the 6-chromanol derivative is 5,5'-methylenebis-(2,7,8-trimethyl-2-propyl-6-chromanol).

5. A compound as defined in claim 1 wherein the 6-chromanol derivative is 2,2,7,8-tetramethyl-5-(2'-hydroxy-5'-methylbenzyl)-6-chromanol.

6. A compound as defined in claim 1 wherein the 6-chromanol derivative is 2,2,7,8 - tetramethyl - 5 - (2'-hydroxy-5'-chlorobenzyl)-6-chromanol.

7. A compound as defined in claim 1 wherein the 6-chromanol derivative is 2,2,7,8-tetramethyl-5-(2'-hydroxy-3'-5',6'-trimethylbenzyl)-6-chromanol.

8. A compound as defined in claim 1 wherein the 6-chromanol is 2,2,7,8-tetramethyl-5-(2'-hydroxy - 3',5' - dimethylbenzyl)-6-chromanol.

9. A compound as defined in claim 1 wherein the 6-chromanol derivative is 2,2,7,8-tetramethyl-5-(2'-hydroxy-1'-naphthylmethyl)-6-chromanol.

10. A compound as defined in claim 1 wherein the 6-chromanol is 2,2,7,8-tetramethyl-5-(2',5'-dihydroxy-3',4',6'-trimethylbenzyl)-6-chromanol.

11. A compound as defined in claim 1 wherein the 6-chromanol is 2,2,7,8-tetramethyl-5-(2'-hydroxy-5'-p-toluylbenzyl)-6-chromanol.

12. A compound as defined in claim 1 wherein the 6-chromanol is 2,7,8-trimethyl-2-phenyl-5-(2'-hydroxy - 5'-methylbenzyl)-6-chromanol.

13. A compound as defined in claim 1 wherein the 6-chromanol is 2,2,7,8-tetramethyl-5-(3',5'-dimethyl-4'-hydroxybenzyl)-6-chromanol.

14. A compound as defined in claim 1 wherein the 6-chromanol is 2,7,8-trimethyl-2-ethyl-5-(3',5'-dimethyl-4'-hydroxybenzyl)-6-chromanol.

15. 5,5'-methylenebis-(7,8-dimethoxy-2,2-dimethyl - 6-chromanol).

16. A compound as defined in claim 1 wherein the 6-chromanol is 7,8-dimethoxy-2,2-dimethyl-5-(2'-hydroxy-3',5',6'-trimethylbenzyl)-6-chromanol.

References Cited

UNITED STATES PATENTS

| | | | |
|---|---|---|---|
| 2,843,604 | 7/1958 | Hawks | 260—345.5 |
| 3,173,927 | 3/1965 | Nelan | 260—345.5 |

OTHER REFERENCES

Jenny, Academie des Science-Computes Rendus, vol. 246, pp. 3477–8 (1958).

Jenny, Chemical Abstracts, vol. 55, col. 7350 (1961).

HENRY R. JILES, Primary Examiner

JOHN M. FORD, Assistant Examiner

U.S. Cl. X.R.

99—163; 252—407